Patented Nov. 20, 1923.

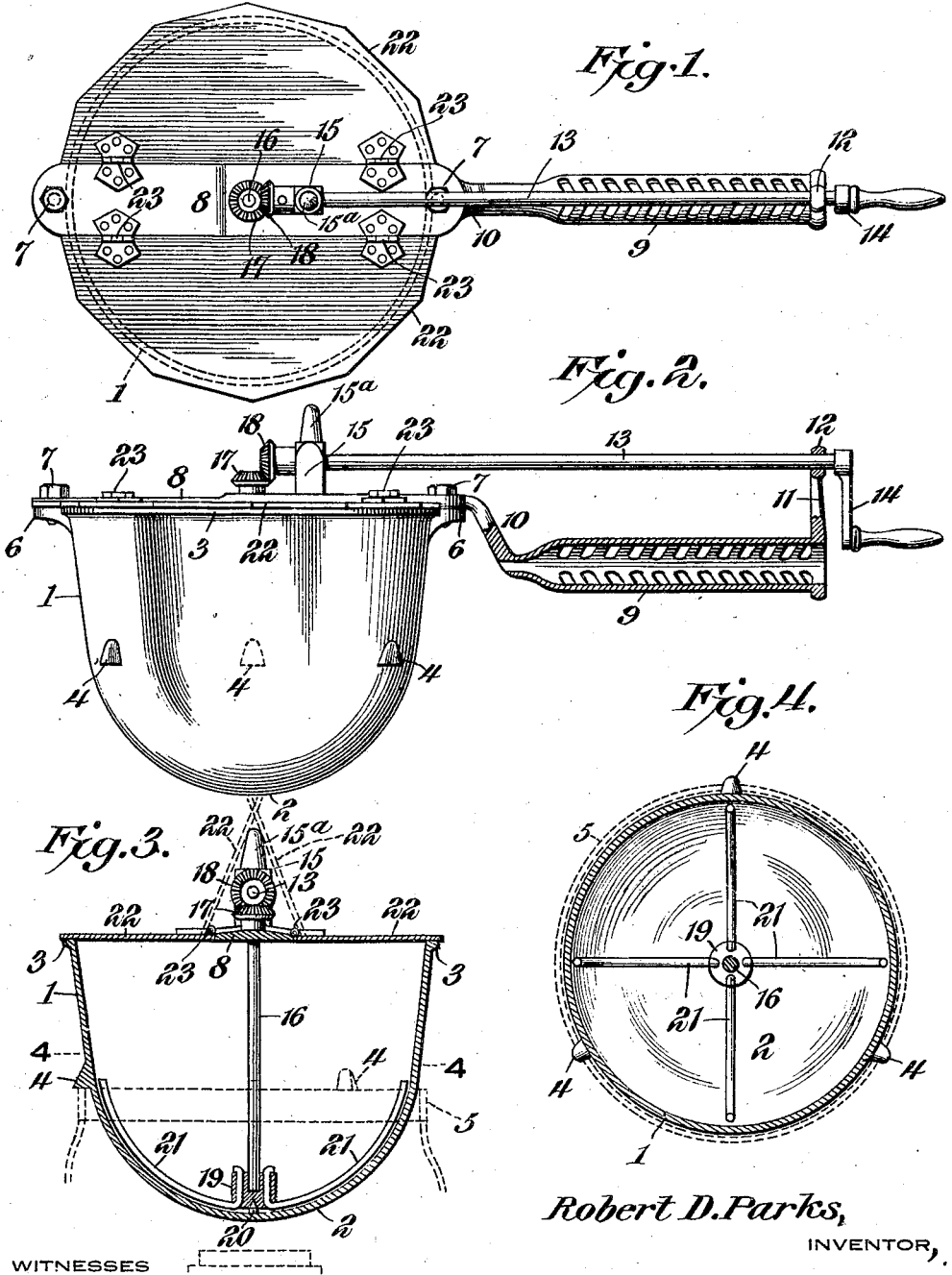

1,475,081

UNITED STATES PATENT OFFICE.

ROBERT D. PARKS, OF LOHRVILLE, IOWA, ASSIGNOR TO W-M-P MANUFACTURING CO., OF LOHRVILLE, IOWA, A CORPORATION OF IOWA.

POP-CORN KETTLE.

Application filed February 3, 1919. Serial No. 274,687.

*To all whom it may concern:*

Be it known that I, ROBERT D. PARKS, a citizen of the United States, residing at Lohrville, in the county of Calhoun and State of Iowa, have invented a new and useful Pop-Corn Kettle, of which the following is a specification.

This invention has reference to kettles for popping corn, and its object is to provide means whereby the popping operation imparts to the corn a more agreeable flavor than ordinarily and the kernels when popped are larger and fluffier than is customary.

In accordance with the invention there is provided a closed kettle with a rounded and approximately semi-spherical bottom and provided with a stirrer and a manipulating handle, with the stirrer having actuating means extending to the end of the handle and supported by said handle. The stirrer comprises a shaft axially disposed with relation to the longitudinal axis of the kettle, which latter may approach a parabolic form, and arms are provided on the shaft conforming generally to the curved shape of the kettle, said arms being of rounded cross section and may conveniently be made of wire.

Furthermore, the kettle is provided with a handle having a drop portion adjacent to the body of the kettle, thereby greatly facilitating the handling of the kettle, especially when pouring popped corn therefrom.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modications mark no material departure from the salient features of the invention as expressed in the appended claims.

In the drawing:—

Figure 1 is a top view of the kettle.

Figure 2 is a side elevation thereof with the handle in longitudinal section.

Figure 3 is a vertical cross section of the kettle at right angles to the showing of Figure 2.

Figure 4 is a section on the line 4—4 of Figure 3.

Referring to the drawing, there is shown a kettle 1 having a rounded bottom 2, the body of the kettle being of approximately parabolic form, although not necessarily confined to such particular shape. It is imperforate throughout. The top or mouth end of the kettle is formed with an outstanding flange or ledge 3, and intermediate of the height of the kettle it is provided with outstanding lugs 4. In the drawing three lugs are shown, this being found to be an efficient number, permitting the kettle to rest evenly upon a sustaining ring, indicated in dotted lines at 5 in Figures 3 and 4, and shown and described in greater detail in an application for a corn popper, filed by me Feb. 3, 1919, No. 274,688.

On opposite sides of the upper edge or mouth of the kettle are projecting ears 6. These ears are designed to each receive a cap screw 7 extending through a transverse bar 8 extending across the top of the kettle and carrying a handle 9 at one end, the handle and bar being connected by an offset or drop shank 10 so that the level of the handle, when the kettle is in operative position, is lower than that of the top of the kettle. This is for the purpose of more completely balancing the weight of the kettle when dumping the corn from the kettle. It also takes the handle away from the rod or shaft actuating the agitator. The handle 9 is shown as of the air-cooled type and as integral with the bar 8, with the shank 10 inclined and the handle in a substantially horizontal position. It will be understood, of course, that any other suitable form of handle may be employed. In the showing of the drawing, that end of the handle remote from the shank 10 is provided with an upstanding post 11 terminating in a bearing 12 for a shaft 13 having a turning crank 14 adjacent to the outer end of the handle. Erected on the bar 8 is another post 15 constituting a bearing for the shaft 13. Extending through the bar 8 is a stirrer shaft 16 carrying at a point above the bar a bevel pinion 17 meshing with another bevel pinion 18 on the shaft 13 adjacent to the post 15.

The stirrer shaft 16 is located in the longitudinal axis of the kettle 1, and at the lower end is provided with a hub 19 having a step bearing 20 arranged centrally in the bottom of the kettle 1. The hub 19 carries a circular series of stirrer or agitator arms 21 which may be made of wire, preferably of round cross section, and these stirrer arms conform to the curved shape of the inner surface of the kettle, the arms being of sufficient length of rise to a considerable distance along the sides of the kettle, say about to the height of the lugs 14. This is between one third and one-half the height of the kettle. The arms fit very close to but do not touch the kettle bottom. The short step bearing provides for this.

The bar 8 is provided on opposite sides with lids or covers 22 connected to said bar by hinges 23, so that these covers may be opened upwardly toward each other to permit the introduction of unpopped corn into the kettle and the discharge of popped corn therefrom. The post 15 has an upward continuation 15ᵃ forming a stop preventing the covers 22, when open, from hitting the gear 18.

In the use of the kettle, a grease, such as lard or some suitable substitute, is placed in the kettle and when the latter is hot and the grease melted the unpopped corn in sufficient quantity is placed in the kettle, after which the covers are closed, and while the kettle is subjected to heat, the stirrer arms 21 are turned by means of the crank shaft 13. The grains of corn become coated with the grease and the heat is transmitted over the entire surface of the grain. The grease serves to toughen the outer skin of the grains of corn so that the applied heat tends to swell the grains to a greater extent than customary before the skin is ruptured or the grains burst. The result is that the added internal pressure causes a larger expansion of the contents of the grain, thus producing a larger, lighter, and more fluffy popped grain.

The popping of the corn in a closed vessel has been found to greatly improve the product because there is no loss of volatile contents of the corn and the flavor is retained. Corn while popping liberates a certain amount of volatile oil and vapor, which is kept in contact with the corn, is absorbed by the popped corn, or is cooked into it. This gives the corn a delicious flavor and renders it crisp and tender. A product results which is a marked improvement over anything previously put upon the market, though butter is not used.

The grease employed is not apparent in the popped corn, which will not grease the sack in which it is sold, nor will it grease the fingers of the person eating it. Moreover, a larger volume of popcorn is obtained from a given amount of unpopped corn when the corn is popped in the enclosed kettle and when lard or other suitable grease is employed. Experience has shown that there are very few unpopped grains of corn, as compared with the many partly open grains which result when corn is popped in a perforated or open receptacle without the grease.

The form of the stirring device and the rounded bottom of the kettle are extremely important, since, as the corn is stirred, it is evenly distributed and consequently evenly heated and popped. The tendency of the stirrer is to force the corn outwardly toward the sides of the kettle, but this is counteracted by the elevation of the corn by the arms, and the falling of the grains by gravity to the central part of the kettle, thus producing a very complete agitation of the corn. Moreover, the round wire stirrer arms will pass over any small particles in the bottom of the kettle, never causing any jamming or undue friction, as would be the case with flat or blade-like stirrers.

What is claimed is:—

1. A popping kettle for corn poppers having a closed top and an imperforate body portion having an approximately semi-spherical bottom with rounded sides, the rounded portion of the bottom and sides embracing fully one-third the height of the kettle, the bottom being provided with a centralized step bearing rising slightly from the bottom, and a stirrer mounted on the step bearing to rotate about an upright axis and held by said bearing close to the bottom without touching it, said stirrer comprising a shaft extending above the top of the kettle and having at its lower end a hub adapted to fit the step bearing, and arms extending from the hub and curving lengthwise in conformity with the curvature of the bottom of the kettle and formed of wire of rounded cross section, said arms extending up the sides fully one-third the height of the kettle.

2. A popping kettle for corn poppers provided with a handle extending from one side thereof in a substantially horizontal position and located in a plane below the top of the kettle, said handle being connected to the body of the kettle by a drop shank having its drop portion inclined and spaced from the side of the kettle, a stirrer for the kettle, a shaft mounted in bearings provided on said handle and kettle, and located above the plane of the handle, a crank for said shaft, and driving mechanism between said shaft and said stirrer, said handle being spaced sufficiently below said shaft to allow the handle to be grasped without interference from said shaft.

3. A kettle comprising a body portion, an offset handle, a bar integral with the handle and extending transversely across the top of the kettle, said handle being connected to said bar by an inclined shank dropped with relation to the bar to bring the handle at a lower level than the top of the kettle and in a substantially horizontal position, a shaft mounted in bearings provided on said bar and handle and above the latter, a crank on said shaft outside the handle, and a stirrer mounted in said bar and geared to said shaft, said handle being spaced from said shaft to allow the handle to be grasped.

In testimony, that I claim the foregoing as my own, I have hereto affixed my signature.

ROBERT D. PARKS.

Witnesses:
    Geo. R. Moss,
    B. H. Coulter.